(12) United States Patent
Jung et al.

(10) Patent No.: US 10,137,759 B2
(45) Date of Patent: Nov. 27, 2018

(54) HEATING DEVICE FOR THE VEHICLE INTERIOR OF A VEHICLE

(71) Applicant: AUDI AG, Ingolstadt (DE)

(72) Inventors: Sebastian Jung, Wettstetten (DE); Klaus Richter, Weimar (DE); Dirk Huschke, Rittersdorf (DE)

(73) Assignee: AUDI AG, Ingolstadt (DE)

(*) Notice: Subject to any disclaimer, the term of this patent is extended or adjusted under 35 U.S.C. 154(b) by 194 days.

(21) Appl. No.: 14/438,063

(22) PCT Filed: Oct. 12, 2013

(86) PCT No.: PCT/EP2013/003075
§ 371 (c)(1),
(2) Date: Apr. 23, 2015

(87) PCT Pub. No.: WO2014/063792
PCT Pub. Date: May 1, 2014

(65) Prior Publication Data
US 2015/0291006 A1 Oct. 15, 2015

(30) Foreign Application Priority Data
Oct. 24, 2012 (DE) .................. 10 2012 020 870

(51) Int. Cl.
*H05B 3/56* (2006.01)
*B60H 1/22* (2006.01)
(Continued)

(52) U.S. Cl.
CPC .............. *B60H 1/2215* (2013.01); *B60N 3/04* (2013.01); *H05B 3/0042* (2013.01); *H05B 3/34* (2013.01);
(Continued)

(58) Field of Classification Search
CPC .......... B60H 1/2215; B60H 2001/2293; H05B 2203/032; H05B 3/0042; H05B 3/34; H05B 3/565
(Continued)

(56) References Cited

U.S. PATENT DOCUMENTS 3,619,555 A * 11/1971 Bassett, Jr. .......... B60H 1/2225
219/202
3,619,562 A * 11/1971 Jacobs .................... F24C 7/065
219/202
(Continued)

FOREIGN PATENT DOCUMENTS

CN          101896370          11/2010
DE          100 46 216          4/2002
(Continued)

OTHER PUBLICATIONS

Chinese Search Report dated Apr. 1, 2016 with respect to counterpart Chinese patent application 201380055406.3.
(Continued)

*Primary Examiner* — Dana Ross
*Assistant Examiner* — Joe E Mills, Jr.
(74) *Attorney, Agent, or Firm* — Henry M. Feiereisen LLC

(57) ABSTRACT

A heating device for the vehicle interior of a vehicle is configured in the form of an infrared (IR) radiator with a textile-based heating band arranged, in a reflector housing. The textile-based heating band is made of a mixed yarn of basalt and stainless steel. Such a heating device can be installed in a footwell of a vehicle.

13 Claims, 2 Drawing Sheets

(51) Int. Cl.
*H05B 3/34* (2006.01)
*B60N 3/04* (2006.01)
*H05B 3/00* (2006.01)

(52) U.S. Cl.
CPC ..... *H05B 3/565* (2013.01); *B60H 2001/2293* (2013.01); *H05B 2203/032* (2013.01)

(58) Field of Classification Search
USPC ............ 296/178.05, 187.08, 97.23; 392/343, 392/351, 407, 408, 428, 460, 375, 435, 392/426; 219/202, 529
See application file for complete search history.

(56) References Cited

U.S. PATENT DOCUMENTS

| | | | | |
|---|---|---|---|---|
| 3,760,152 | A * | 9/1973 | Saito | G03G 21/0088 219/383 |
| 5,292,578 | A * | 3/1994 | Kolzer | B29C 70/025 139/383 R |
| 5,573,686 | A * | 11/1996 | Lavicska | B62D 25/18 219/202 |
| 5,573,687 | A * | 11/1996 | Tanaka | E01C 11/265 219/213 |
| 6,215,956 | B1 * | 4/2001 | Lee | F24C 7/065 392/373 |
| 6,448,540 | B1 * | 9/2002 | Braunisch | H05B 6/6482 219/681 |
| 7,255,916 | B2 * | 8/2007 | Vichniakov | B29C 70/885 244/133 |
| 7,762,053 | B2 * | 7/2010 | Takada | A41D 19/01511 57/230 |
| 7,794,851 | B2 * | 9/2010 | Vichniakov | C22C 47/068 427/180 |
| 8,859,938 | B2 * | 10/2014 | Eisenhour | B60H 1/00742 219/202 |
| 2003/0209003 | A1 * | 11/2003 | Verstraeten | D02G 3/441 57/212 |
| 2004/0009728 | A1 * | 1/2004 | Kubomura | B29C 70/22 442/205 |
| 2004/0100131 | A1 * | 5/2004 | Howick | B60N 2/5678 297/180.12 |
| 2004/0115439 | A1 * | 6/2004 | Degroote | A41D 31/0027 428/423.1 |
| 2005/0067402 | A1 * | 3/2005 | Green | H05B 3/347 219/515 |
| 2005/0136326 | A1 * | 6/2005 | Aisenbrey | B29C 45/0001 429/178 |
| 2006/0078318 | A1 * | 4/2006 | Misumi | B60H 1/22 392/407 |
| 2006/0116040 | A1 * | 6/2006 | Yun | B29C 47/0016 442/2 |
| 2007/0000912 | A1 * | 1/2007 | Aisenbrey | H05B 3/54 219/528 |
| 2007/0035253 | A1 * | 2/2007 | Mewissen-Scholberg | H05B 35/00 315/159 |
| 2007/0175878 | A1 * | 8/2007 | Jones | F24D 13/02 219/213 |
| 2007/0237942 | A1 * | 10/2007 | Linker | B32B 37/04 428/309.9 |
| 2008/0063875 | A1 * | 3/2008 | Robinson | B32B 1/08 428/426 |
| 2008/0290080 | A1 * | 11/2008 | Weiss | H05B 1/0238 219/202 |
| 2009/0289045 | A1 * | 11/2009 | Hotary | B60H 1/2225 219/202 |
| 2009/0291604 | A1 * | 11/2009 | Park | A41D 31/0038 442/164 |
| 2010/0173152 | A1 * | 7/2010 | Beraud | B29B 11/16 428/361 |
| 2011/0127246 | A1 * | 6/2011 | Heiden | B60L 1/02 219/202 |
| 2011/0162126 | A1 * | 7/2011 | Zhang | D04B 1/22 2/159 |
| 2012/0013433 | A1 * | 1/2012 | Rauh | H05B 3/34 338/296 |
| 2012/0061365 | A1 * | 3/2012 | Okamoto | B60H 1/2225 219/202 |
| 2012/0103959 | A1 * | 5/2012 | Kim | B60H 1/2221 219/202 |
| 2012/0134655 | A1 * | 5/2012 | Chan | F24C 7/04 392/426 |
| 2012/0267354 | A1 * | 10/2012 | Okamoto | F24D 13/02 219/202 |
| 2013/0212974 | A1 * | 8/2013 | Sullivan | E02D 17/20 52/659 |
| 2014/0045142 | A1 * | 2/2014 | Becker | A61C 5/42 433/102 |
| 2014/0079950 | A1 * | 3/2014 | Aisenbrey | H01B 1/24 428/371 |
| 2014/0090349 | A1 * | 4/2014 | Fisher | D02G 3/367 57/222 |
| 2014/0124494 | A1 * | 5/2014 | Wei | H05B 3/24 219/202 |
| 2014/0137695 | A1 * | 5/2014 | Permut | B60N 2/5685 74/513 |
| 2014/0346160 | A1 * | 11/2014 | Moench | B60H 1/00742 219/202 |
| 2015/0028119 | A1 * | 1/2015 | Satzger | B60H 1/2215 237/28 |
| 2015/0056881 | A1 * | 2/2015 | Zhang | B32B 5/00 442/268 |
| 2016/0039265 | A1 * | 2/2016 | Ota | B60H 1/00742 165/202 |
| 2016/0046174 | A1 * | 2/2016 | Sagou | H05B 1/0236 392/375 |
| 2016/0068044 | A1 * | 3/2016 | Sagou | B60H 1/2215 165/203 |

FOREIGN PATENT DOCUMENTS

JP  H04159124 A  6/1992
JP  2007001355 A  2/2007

OTHER PUBLICATIONS

Translation of Chinese Search Report dated Apr. 1, 2016 with respect to counterpart Chinese patent application 201380055406.3.
International Search Report issued by the European Patent Office in International Application PCT/EP2013/003075.

* cited by examiner

HEATING DEVICE FOR THE VEHICLE INTERIOR OF A VEHICLE

CROSS-REFERENCES TO RELATED APPLICATIONS

This application is the U.S. National Stage of International Application No. PCT/EP2013/003075, filed Oct. 12, 2013, which designated the United States and has been published as International Publication No. WO 2014/063792 and which claims the priority of German Patent Application, Serial No. 10 2012 020 870.7, filed Oct. 24, 2012, pursuant to 35 U.S.C. 119(a)-(d).

BACKGROUND OF THE INVENTION

The invention relates to a heating device for the vehicle interior of a vehicle, in particular for the footwell of a vehicle, and to a vehicle having a heating device according to the invention arranged in the footwell.

DE 20 2006 007 548 discloses a generic heating device as foot heating for installation into a vehicle footwell. This heater has a base part, an electrically-operated surface heater connected to the base part, and a connection cable connected via a control unit to the surface heater and having an end connector for plugging into an on-board socket of a vehicle. The base part may, hereby, be configured as a flexible mat or as a wedge-shaped footrest.

A disadvantage of this known foot heating for a footwell of a vehicle is that the surface heater generates predominantly only contact heat which should be transmitted to the feet of a vehicle occupant via such a floor mat or footrest. However, this is not always sufficient to rapidly achieve adequate thermal comfort for a vehicle occupant.

SUMMARY OF THE INVENTION

Object of the invention is therefore to provide a heating device for the vehicle interior of a vehicle, in particular for the footwell of a vehicle, to rapidly realize a high thermal comfort for a vehicle occupant and yet requiring only a small power demand.

The object is achieved in accordance with the invention by a heating device for the vehicle interior of a vehicle, which heating device is characterized in that the heating device is configured as IR radiator formed with a textile-based heating band arranged in a reflector housing.

Such a heating device according to the invention represents a high-temperature IR radiator system, which provides conditions that meet the passenger needs because of a body-near placement in the footwell of the vehicle. This heating band represents hereby an IR (infrared) heating fabric.

According to a configuration of the invention, the textile-based heating band is manufactured as IR heating fabric from a mixed yarn of basalt and stainless steel. The use of such a material results in a low thermal inertia of the heating device according to the invention and thereby enables a quick response behavior, i.e., heat is noticeable by a vehicle occupant after a short time.

Preferably, the mixed yarn of basalt and stainless steel is made of a basalt multifilament having a fineness between 50 and 100 tex, preferably of 68 tex, and a stainless steel fiber with a diameter of 0.02 mm to 0.05 mm, preferably of 0.035 mm.

The power demand and the surface temperature of the heating band can be adjusted via the fabric construction and the material ratio. This makes it possible to adjust heat and radiation characteristics of the heating device to the need at hand.

According to a further advantageous configuration of the invention, the textile heating band is arranged on a heating element carrier, which is received by the reflector housing with parabolic cross section. Since the textile-based heating band can reach a temperature of up to 500° C., the reflector housing is covered by a protective grid in accordance with a refinement of the invention. Of course, all forms of suitable covers can be used.

This heating device according to the invention is suitable advantageously for arrangement in a footwell of a vehicle.

BRIEF DESCRIPTION OF THE DRAWING

An exemplary embodiment of the invention is described in greater detail hereinafter with reference to the attached figures. It is shown in.

DETAILED DESCRIPTION OF PREFERRED EMBODIMENTS

Figure 1:
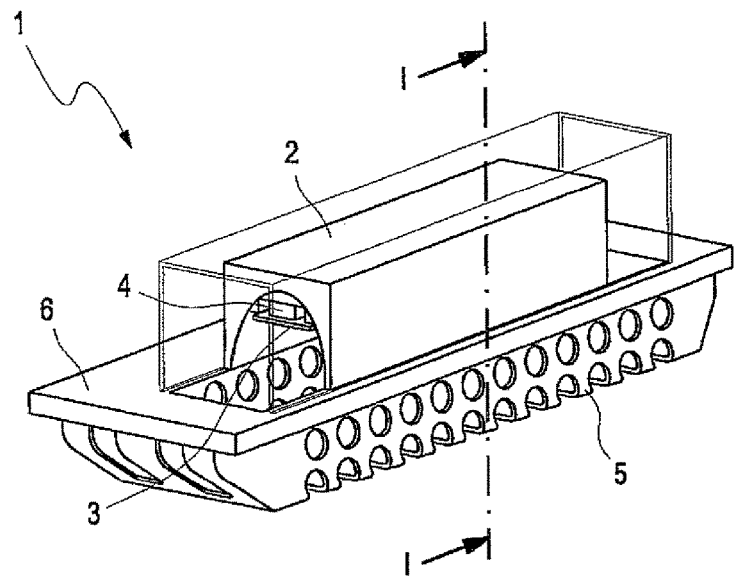
FIG. 1 a schematic and perspective illustration of the structural design of a heating device according to the invention, FIG. 2 a sectional view of the heating device taken along section I-I in FIG. 1, and FIG. 3 a partial schematic representation of a heating device according to the invention received in a footwell of a vehicle with a vehicle occupant.

The heating device 1 according to FIG. 1 is a high-temperature IR radiator system for the vehicle interior of a vehicle and includes a reflector housing 2 which accommodates a heating band (IR heating fabric) 3 arranged on a heating element carrier 4 and generating the infrared radiation. This reflector housing 2 and a protective grid 5, which covers an open side of the radiator housing, are mounted to a support element 6.

Figure 2:
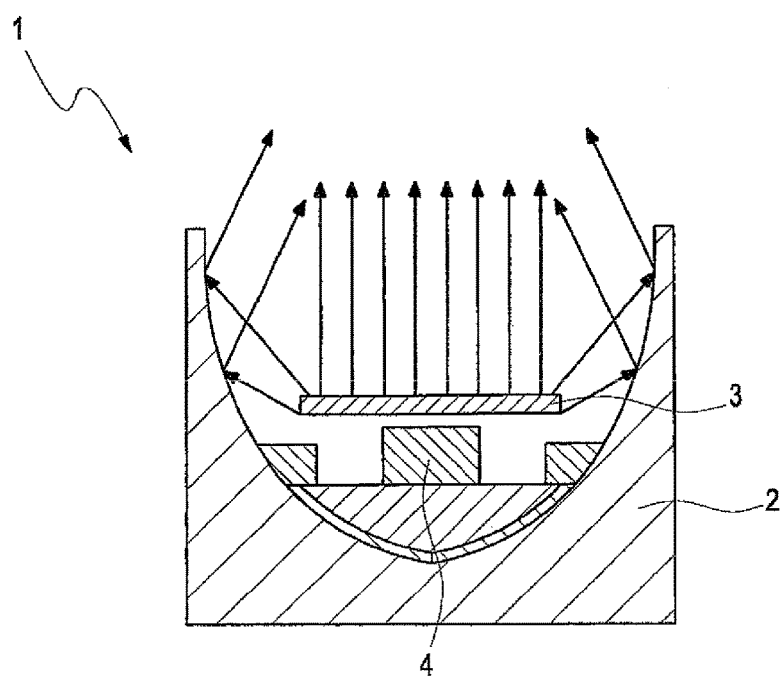

The reflector housing 2 has an inner surface with a parabolic cross section, so that IR rays generated by the heating band 3 exit the reflector housing 2 as directed heat radiation in nearly perpendicular direction to the heating band 3, as shown in FIG. 2. Such a directed IR heat radiation heat enables an effective utilization of heat over great distances.

Figure 3:
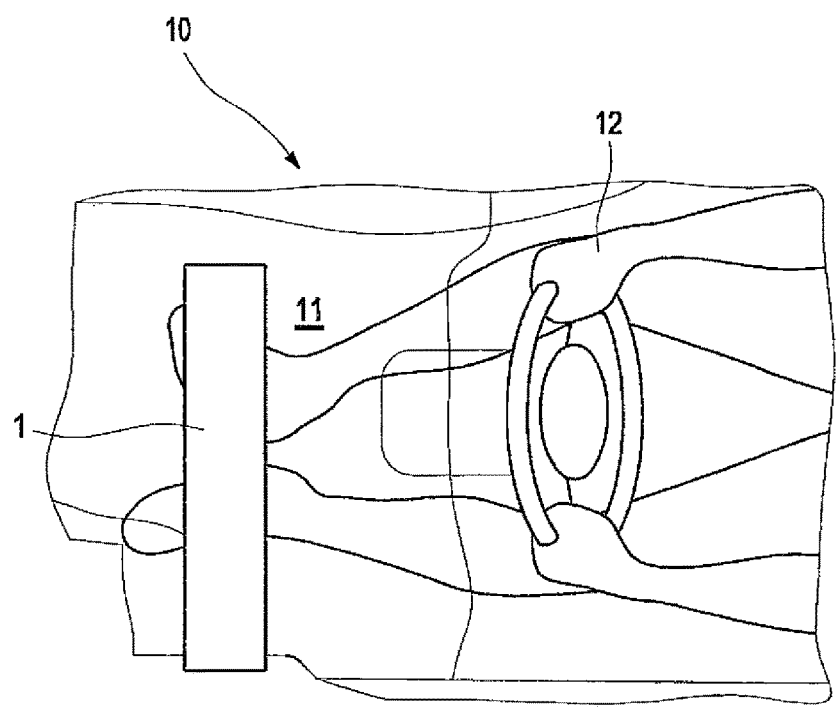

FIG. 3 shows the arrangement of such a heating device 1 in a vehicle 10 with a vehicle occupant, here a driver 12. This heating device 1 is arranged in the upper part of the footwell 11 of the driver 12.

The material of the heating band 3 includes a mixed yarn of basalt fiber and stainless steel, which has a good temperature resistance and a relatively high IR emissivity coefficient of 0.8. Used for this mixed yarn of basalt fiber and stainless steel is an electrically conductive basalt multifilament with a fineness of 68 tex and a 0.035 mm stainless steel fiber. The stainless steel fiber is hereby wrapped with the basalt multifilaments at a wrapping frequency of 40 wrappings/m.

With such a heating band 3 of mixed yarn of basalt fiber and stainless steel, the heating device 1 has a low thermal inertia and thus a rapid response behavior so that heat is noticeable to the driver 12 of the vehicle 10 after a short time. As a result, the cold start phase is shortened, accompanied with an increase in comfort for the driver 12.

The most essential advantage of such a heating device 1 is that no transport medium, i.e. air, is required for the heat, but the vehicle occupants are directly heated by the infrared radiation of such a heating device 1. As a result of such a targeted heat transfer, thermal comfort is significantly enhanced for the vehicle occupants, i.e. the interior comfort is enhanced. Furthermore, the heating device 1 is characterized in that, due to the use of mixed yarn of basalt fiber and stainless steel, the power consumption is very low and thus in particular an increase in efficiency in terms of energy consumption of the vehicle 10 is realized.

The heating device 1 according to the invention can, of course, not only be arranged in the footwell of a vehicle, but is also suitable to be arranged in other regions of the interior space of the passenger compartment.

The invention claimed is:

1. A heating device for a vehicle interior of a vehicle, wherein the heating device is configured as an IR radiator comprising a reflector housing having a parabolic cross section with a textile-based heating band and a heating element carrier arranged in the reflector housing, wherein the textile-based heating band is made of a mixed yarn of stainless steel wrapped on an outside by a basalt multifilament, said heating band having a cross section of uniform thickness to enable heat radiation generated by the heating band to exit perpendicular to the heating band, wherein the heating band has an entirely planar surface without curvature in facing relation to an exit of the reflector housing, wherein the heating band is arranged on the heating element carrier, said heating element carrier arranged below the heating band opposite the heat radiation generated by the heating band.

2. The heating device of claim 1, wherein the basalt multifilament has a fineness between 50 and 100 tex, said stainless steel being a stainless steel fiber with a diameter of 0.02 mm to 0.05 mm.

3. The heating device of claim 2, wherein the fineness is 68 tex.

4. The heating device of claim 2, wherein the diameter of the stainless steel fiber is 0.035 mm.

5. The heating device of claim 1, further comprising a protective grid covering the reflector housing.

6. A vehicle, comprising:
a footwell; and
a heating device configured as an IR radiator comprising a reflector housing having a textile-based heating band and a heating element carrier arranged in the reflector housing, wherein the textile-based heating band is made of a mixed yarn of stainless steel wrapped on an outside by a basalt multifilament, said heating band having a cross section of uniform thickness to enable heat radiation generated by the heating band to exit perpendicular to the heating band, wherein the heating band has an entirely planar surface without curvature in facing relation to an exit of the reflector housing, wherein the heating band is arranged on the heating element carrier, said heating element carrier arranged below the heating band opposite the heat radiation generated by the heating band.

7. The vehicle of claim 6, wherein the basalt multifilament has a fineness between 50 and 100 tex, said stainless steel being a stainless steel fiber with a diameter of 0.02 mm to 0.05 mm.

8. The vehicle of claim 7, wherein the fineness is 68 tex.

9. The vehicle of claim 7, wherein the diameter of the stainless steel fiber is 0.035 mm.

10. The vehicle of claim 6, wherein the reflector housing has a parabolic cross section, said heating device including a heating element carrier accommodated in the reflector housing, said textile heating band being arranged on the heating element carrier.

11. The vehicle of claim 6, wherein the heating device includes a protective grid covering the reflector housing.

12. The heating device of claim 1, wherein the stainless steel is wrapped with a basal multifilament at a wrapping frequency of 40 wrappings/m.

13. The vehicle of claim 6, wherein the stainless steel is wrapped with a basal multifilament at a wrapping frequency of 40 wrappings/m.

* * * * *